FIG. I

INVENTOR.
IGNATIUS J. NIEMKIEWICZ
BY
Meyer, Tilberry & Body
ATTORNEYS

Dec. 16, 1969     I. J. NIEMKIEWICZ     3,484,061

PLURAL PENDANT VEHICLE ARRESTING SYSTEM

Filed Dec. 13, 1967     2 Sheets-Sheet 2

INVENTOR.
IGNATIUS J. NIEMKIEWICZ

BY
Meyer, Tilberry & Body

ATTORNEYS

United States Patent Office 3,484,061
Patented Dec. 16, 1969

3,484,061
PLURAL PENDANT VEHICLE ARRESTING
SYSTEM
Ignatius John Niemkiewicz, Wilmington, Del., assignor to E. W. Bliss Company, Canton, Ohio, a corporation of Delaware
Filed Dec. 13, 1967, Ser. No. 690,218
Int. Cl. B64f 1/02
U.S. Cl. 244—110            7 Claims

ABSTRACT OF THE DISCLOSURE

An improved vehicle arresting system for use on a longitudinally extending vehicle runway. The system includes first and second longitudinally spaced vehicle engaging members extending transversely of the runway; first and second energy absorbing units; and, automatically operable connecting means for connecting the first vehicle engaging member to both the first and second energy absorbing units, and for connecting the second vehicle engaging member to the second energy absorbing unit.

---

The present invention is directed toward the vehicle arresting art and, more particularly, to an arresting system which allows a plurality of pendants or arresting members to be selectively and automatically connected in a predetermined arrangement with a plurality of independently operable energy absorbing units.

The invention is especially adapted for use in aircraft arresting and will be described with particular reference to a preferred type of aircraft arresting system; however, it will be appreciated the invention is capable of broader application and could be used for arresting other types of moving vehicles or in different types of aircraft arresting systems.

In the aircraft arresting gear art, a pendant stretched across a runway has its opposite ends connected to an energy absorber which may take the form of a rotary friction brake, a rotary hydraulic drag device, a rotary air drag device or combinations thereof. One energy absorber may be positioned at one side of the runway and adapted to receive extensions attached to the opposite ends of the pendant or one energy absorber may be positioned on each side of the runway with the pendant extensions received on separate absorbers. Of course, it is possible to use linear energy absorbers on each side of the runways; however, as yet these devices have not gained any extensive commercial success. The rotary energy absorbers now in use include a reel structure onto which the tape is wound in ever increasing stacked convolutions.

In the subject specification and claims, an "energy absorbing unit" is to be considered as any of the above whether mounted on one or both sides of the runway.

One known type of aircraft arresting system includes first and second pendants positioned at spaced locations longitudinally of a runway and extending transversely thereof. The first pendant is usually of the type utilized for engagement and arrestment of hook equipped aircraft, whereas, the second is the barrier type utilized for non-hook equipped aircraft. An energy absorbing unit is continuously connected to the ends of the first pendant to slow and stop an aircraft engaged therewith. The second pendant however, is connected to the same energy absorbing unit by an interconnect scheme which completes the connection only in response to engagement of the second pendant.

This arrangement permits a single energy absorbing unit to supply the necessary arrestment forces to the two separate pendants. Although generally satisfactory, the arrangement has certain distinct disadvantages. For example, the system does not have the capability of readily accommodating a wide range of aircraft weights. As can be visualized, if the energy absorbing unit is set to produce a force sufficiently large to arrest a large hook equipped aircraft, the forces exerted on the barrier net type pendant can be unduly large for small nonhook equipped aircraft.

Although certain arresting units have variable weight setting capabilities, the necessity of resetting depending upon which pendant is to be used is somewhat undesirable. Additionally, in order to allow the resetting to be made rapidly, automatic control interconnects between the arresting unit and the control tower are required.

The present invention provides a system which has the capability of automatically applying different pre-determined loads to separate pendants depending upon which pendant has been engaged. Further, the system allows a substantial infinite variation in the setting relationships between the pendants.

In accordance with the present invention an improved vehicle arresting system is provided for use on a longitudinally extending vehicle runway. The system includes first and second longitudinally spaced vehicle engaging members extending transversely of the runway; first and second energy absorbing units; and, automatically operable connecting means for connecting the first vehicle engaging member to both the first and second energy absorbing units, and for connecting the second vehicle engaging member to the second energy absorbing unit.

As is apparent, if the energy absorbing units are of the fixed setting type the system will automatically produce a setting ratio on the two pendants which is determined by the setting of the two energy absorbing units i.e. if both energy absorbing units are set at the same weight setting, the first pendant will have applied thereto an arresting force which is twice that applied to the second pendant. If the energy absorbing units are independently adjustable to different weight settings an infinitely variable ratio can be obtained between the two pendants.

Accordingly, a primary object of the present invention is the provision of an aircraft arresting system wherein a plurality of energy absorbing units are arranged to be automatically interconnected with a plurality of pendants whereby all of the units will be connected to one of the pendants and only one of the units connected to another of the pendants.

A still further object of the present invention is the provision of an arresting system wherein a plurality of pendants can be selectively interconnected with a plurality of arresting units to automatically produce any desired force relationship on the pendants.

Yet another object is the provision of an aircraft arresting system wherein substantially any level of arresting force can be selectively applied to two separate arresting pendants.

A still further object is the provision of a system for automatically mechanically interconnecting one of a plurality of vehicle engaging pendants with a plurality of arresting gear units.

These and other objects and advantages will become apparent from the following description when read in conjunction with the accompanying drawings wherein.

Figure 1:
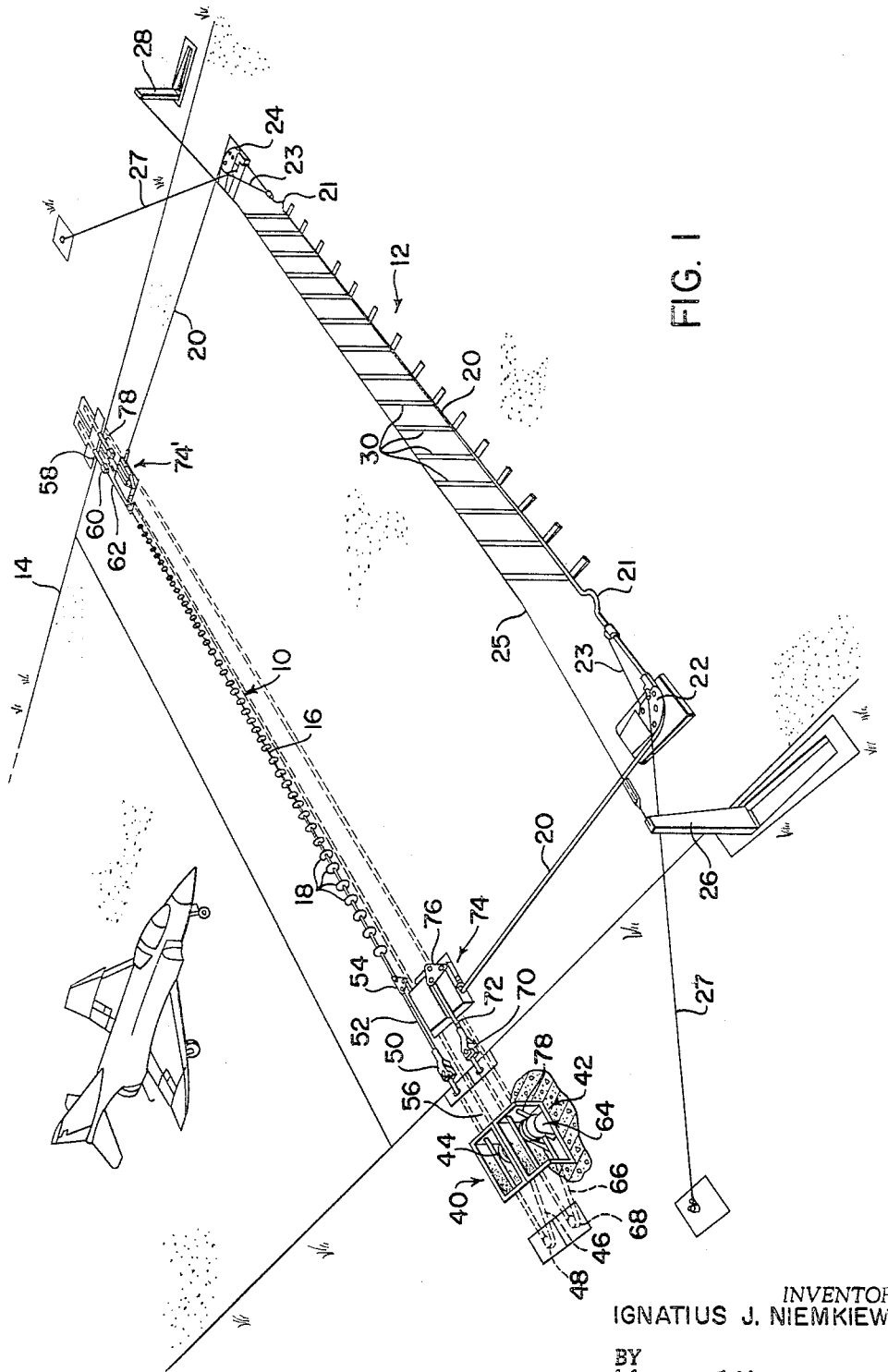
FIGURE 1 is a pictorial view of a runway having a preferred embodiment of the system of the present invention mounted thereon.

Referring now to the drawings wherein the showings are for the purpose of illustrating a preferred embodiment of the invention only and not for the purpose of limiting same, FIGURE 1 shows the overall arrangement of an arresting system A formed in accordance with the present invention.

As shown, the system includes first and second elongated vehicle engaging members 10 and 12 which extend transversely of runway 14 and are longitudinally spaced thereon. Vehicle engaging member 10 is shown as comprised of a conventional cable type pendant 16 which is maintained a pre-determined distance above the surface of the runway by a plurality of spaced support discs 18. Discs 18 function to maintain the pendant at the proper distance above the runway for engagement by a hook equipped aircraft. Alternately however, automatic pendant raising supports such as the type shown in the commonly assigned U.S. patent application, S.N. 626,561, filed Mar. 28, 1967 could be utilized in place of discs 18.

Pendant 12 is shown as a conventional barrier type pendant utilized for non-hook equipped aircraft; however, it should be understood that the present invention could equally well be utilized with any combination of pendant types. As shown, pendant 12 comprises a cable 20 which extends across the runway and around two guide or rub blocks 22 and 24. A second relatively light weight cable 25 extends between two support members 26 and 28. Support members 26 and 28 are arranged so that they may be pivoted down flush with the runway surface to move cable 25 to a lowered position so that normal runway traffic can pass thereover. Extending downwardly at spaced locations along cable 24 are a plurality of flexible web members 30. Members 30 are connected at their lower end portions to cable 20. Normally this transverse section of the cable 20 is provided with some slack such as shown at 21. Additionally, shear cables or ropes 23 and 27 are connected at opposite ends of the transverse section. Consequently, as a non-hook equipped aircraft moves in the direction shown by the arrow on the runway, the nose wheel gear engages cable 25 which causes the transverse section of cable 20 to be raised upwardly behind the nose wheel for engagement with the main landing gear of the aircraft. Continued movement of the aircraft causes ropes or cables 23, 25 and 27 to shear or break and cable 20 to be pulled down the runway by the aircraft.

In the past, it has been the practice to connect the two pendants 10 and 12 to a single energy absorbing assembly. Normally, the first pendant 10 was continuously connected at its opposite ends to the energy absorbing unit whereas the second pendant 12 was connected through a hook and eye assembly which engaged only in response to movement of the pendant as caused by a moving aircraft. This arrangement was generally satisfactory; however, as previously discussed, certain difficulties were experienced. For example, normally the hook equipped aircraft which utilized pendant 10 were substantially heavier than the non-hook equipped aircraft which utilized the barrier pendant 12. For this reason, different arresting forces were required to be applied to the two pendants. As a consequence, it was necessary to readjust the setting of the energy absorbing unit depending upon which pendant was to be used.

The present invention provides an arrangement whereby two independently operable energy absorbing units can both be connected to pendant 10 and only one of the units connected to pendant 12. Consequently, the system provides for an automatic variation in the forces applied to the two pendants without requiring readjustment of the energy absorbing units.

Referring specifically to FIGURE 1, there are shown two conventional energy absorbing and arresting units 40 and 42. The particular type of energy absorbing and arresting units utilized in the practice of the present invention are not important; however, the arresting units shown are of the type described in U.S. Patent 3,142,458 to Byrne et al. Alternately, the arresting units could be of the type shown in U.S. Patent 2,977,076 to Byrne et al. or any other type capable of applying the required arrestment forces to the pendants.

The specific construction and arrangement of the energy absorbing and arrestting units 40 and 42 can be understood by reference to the Patent 3,142,458; however, broadly, these units each include a large diameter dual reel assembly which is provided with a heavy duty brake unit arranged to apply a controlled braking force to retard and stop rotation of the dual reel assembly. Heavy bands or tapes formed from a synthetic fiber such as nylon are wound on each of the two reels of the assembly in ever increasing convolutions. The opposite ends of the tapes are connected to the arresting pendant so that engagement of the pendant causes the tapes to be unwound and rotate the reels. The application of the controlled braking force to the reels produces the required arrestment forces to slow and stop the aircraft. Specifically, in the embodiment shown, assembly 40 includes a dual reel 44. A first tape 46 is wound about one of the reels and extends therefrom about a conventional guide or sheave 48 to a connector 50 which is connected to a cable 52 that is in turn connected to one end of cable 16 by a three-way connector 54. A second tape member 56 is wound about the other reel and extends therefrom through a conduit (not shown) under the runway, about a sheave or guide assembly 58. and into engagement with a cable connector 60 which is in turn connected through a short length of cable 62 with the opposite end of pendant cable 16. Consequently, energy absorbing and arresting unit 40 is continuously connected with pendant cable 16.

Figure 2:
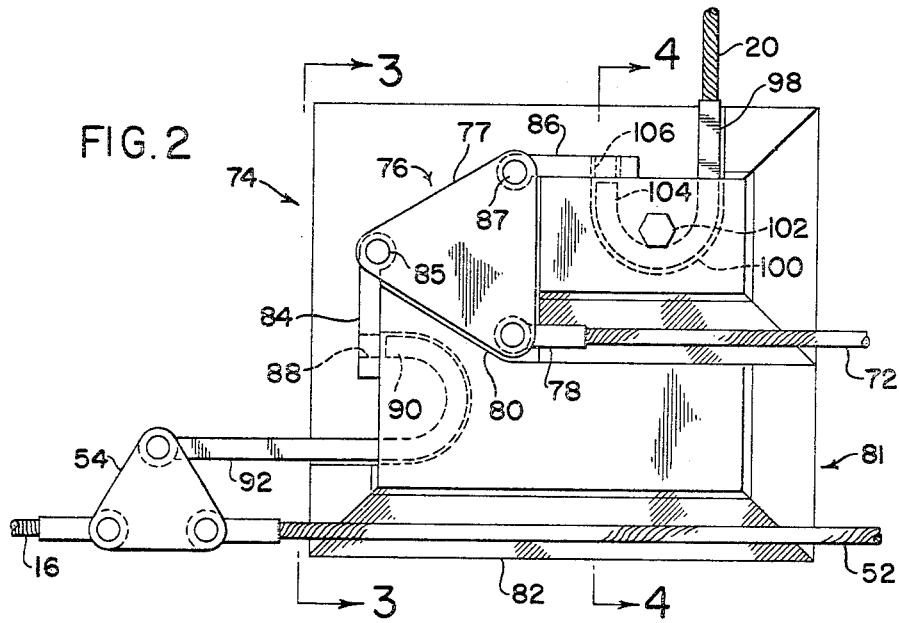
FIGURE 2 is an enlarged plan view of one of the automatic interconnect mechanisms.
Figure 3:
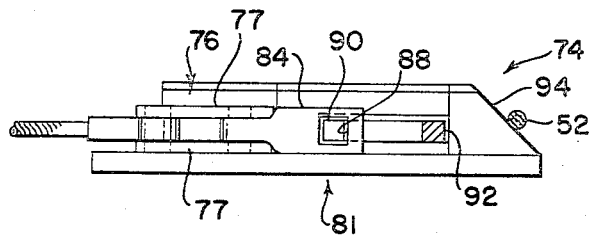
FIGURE 3 is a cross-sectional view taken on line 3—3 of FIGURE 2.
Figure 4:
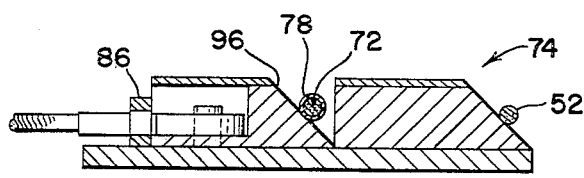
FIGURE 4 is a cross-sectional view taken on line 4—4 of FIGURE 2.

The second energy absorbing and arresting unit 42 is, as previously mentioned, arranged so as to be automatically connected with either cable 16 or cable 20 depending upon which of the cables has been engaged by an aircraft. The energy absorbing unit 42 is shown as being identical in construction to unit 40; however, this unit could obviously be of a type or size different from unit 40. Specially, as shown, the unit 42 includes a dual reel assembly 64. A first tape member 66 is wound about one of the reels of the reel assembly 64 and extends around a guide member 68 into engagement with a cable connector 70. A short length of connecting cable 72 extends from connector 70 to an interconnect assembly 74. A second elongated tape member 78 is wound about the other reel of the dual reel assembly 64 and extends through a conduit under runway 14 and about a conventional guide assembly 78 into engagement with a second interconnect assembly 74'. Interconnect assemblies 74 and 74' provide means for automatically connecting the second energy absorbing and arresting unit 42 with whichever one of pendants 12 or 10 have been engaged by an aircraft. These interconnect assemblies could be of a variety of specific constructions; however, the preferred manner of construction is as shown in FIGURES 2 through 4. In the preferred embodiment of the invention, units 74 and 74' are identical in all respects except that unit 74' is a mirror image of unit 74. Accordingly, only unit 74 will be described in detail and it is to be understood that the description thereof is to be equally applicable to unit 74'.

Referring specifically to FIGURE 2 it is shown that assembly 74 includes a three-way link member 76 which is pivotally connected through an eye member 78 and a pin 79 to cable 72. The three-way connector 76 is positioned in a recess 80 formed in a base plate member 81 which is firmly anchored in position on or adjacent the runway 14. Base plate member 81 could have a variety of configurations, but is shown as being generally rectangular and of welded plate construction.

Three-way connector 76 provides mechanical means for selectively interconnecting the second energy absorbing and arresting unit 42 with either of the pendant cables 16 or 20. As shown in FIGURE 2, the connector 76 includes two triangular plates 77 to which are pivotally connected a pair of eye members 84 and 86 by pins 85 and 87. Member 84 has an opening 88 which is arranged to receive the end 90 of a hook 92 which is pivotally connected to connector 54. Consequently, when cable 16 is engaged by a moving vehicle the hook 92 is moved transversely causing its end 90 to enter opening 88 of eye member 84 to thus complete the connection between cable 16 and the energy absorbing and arresting unit 42. The continued transverse movement of the hook 92 causes it to pull the three-way connector 76 from its position in recess 80. The base member 82 is provided with inclined surfaces 94 and 96 which permit the cables 52 and 72 to slide up and move freely over the top of the base member as the tapes are played out from the winding reel assemblies of the energy absorbing and arresting units 40 and 42.

A generally similar arrangement is provided for interconnecting cable 20 with the energy absorbing and arresting unit 42. As shown, cable 20 extends around guide or rub blocks 22 and 24 back to the respective interconnect units 74 and 74'. The end of cable 20 which extends to interconnect unit 74 terminates in a large hook member 98 which is received in an opening 100 formed in the forward face of base member 82. A shear pin 102 passes downwardly through the top of the base member and functions to maintain the hook fixed in the base except in response to engagement of cable 20 by an aircraft, which causes the pin 102 to shear and release the hook. Hook 98 terminates in an outer end portion 104 which is arranged to enter an opening 106 formed in eye member 86. As is apparent, movement of cable 20 caused by a vehicle engaging the pendant section of the cable causes the shear pin to be broken and hook 98 to enter opening 106 of eye member 86. This then completes the connection between cable 20 and the energy absorbing and arresting unit 42. As the cable is pulled down the runway, the three-way connector moves forward from recess 80 and causes the tapes to be unwound from the tape reel assembly of unit 42.

Although not shown in detail it is to be understood that the interconnect unit 74' is identical in construction but of opposite hand from that described with reference to interconnect unit 74. Consequently, it can be seen that the subject invention provides a simple automatically operable mechanical interconnect scheme which provides rapid selective connection between cables 16 or 20 and the energy absorbing and arresting unit 42.

The invention has been described in great detail sufficient to enable one of ordinary skill in the arresting grear art to make and use the same. Obviously modifications and alterations of the preferred embodiment will occur to others upon a reading and understanding of the specification and it is my intention to include all such modifications and alterations as part of my invention.

Having thus described my invention, I claim:

1. An improved vehicle arresting system for use on a longitudinally extending vehicle runway comprising:
   first and second longitudinally spaced vehicle engaging members extending transversely of said runway;
   first and second independently operable energy absorbing units; and
   connecting means for connecting said first vehicle engaging member to both said first and second energy absorbing assemblies, and for connecting said second vehicle engaging member only to said second energy absorbing assembly.

2. The vehicle arresting system as defined in claim 1 wherein said connecting means automatically connect said second engaging member to said second energy absorbing assembly in response to engagement of said second engaging member by a vehicle.

3. The vehicle arresting system as defined in claim 1 wherein said connecting means continuously connects said first engaging member to said first energy absorbing unit and connects it to said second energy absorbing unit in response to said first engaging member being engaged by the vehicle.

4. An improved vehicle arresting apparatus for use on a longitudinally extending vehicle runway comprising:
   a plurality of vehicle engaging members spaced longitudinally of said runway and extending transversely thereof;
   a plurality of energy absorbing assemblies for connection to said engaging members; and,
   first connecting means engaged by movement of a first one of said engaging members for automatically connecting said first engaging member to a plurality of said energy absorbing units.

5. Improved vehicle arresting apparatus as defined in claim 4 wherein said one engaging member is continuously connected to one of said energy absorbing units.

6. Improved vehicle arresting apparatus as defined in claim 4 and including second connecting means engaged by movement of a second set of engaging members for connecting said second engaging members to one of said energy absorbing units.

7. The improved vehicle arresting apparatus as defined in claim 4 wherein said first connecting means comprises:
   a first hook element carried by said first of said engaging members, a second eye member connected to one of said energy absorbing means, and means for guiding said hook member into said eye member in response to movement of said first of said engaging members.

References Cited

UNITED STATES PATENTS 2,675,197 4/1954 Hospers _____ 244—110
2,777,653 1/1957 Cotton et al. _____ 244—110

MILTON BUCHLER, Primary Examiner

P. E. SAUBERER, Assistant Examiner